(12) United States Patent
Radunovic et al.

(10) Patent No.: US 12,425,879 B2
(45) Date of Patent: Sep. 23, 2025

(54) REAL-TIME RADIO ACCESS NETWORK ANALYTICS

(71) Applicant: Microsoft Technology Licensing, LLC, Redmond, WA (US)

(72) Inventors: Bozidar Radunovic, Cambridge (GB); Xenofon Foukas, Cambridge (GB); Yongguang Zhang, Redmond, WA (US); Arun Bhamidimarri, North Brunswick, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 17/398,719

(22) Filed: Aug. 10, 2021

(65) Prior Publication Data

US 2022/0377577 A1   Nov. 24, 2022

Related U.S. Application Data

(60) Provisional application No. 63/190,022, filed on May 18, 2021.

(51) Int. Cl.
*H04W 24/02* (2009.01)
*H04B 17/318* (2015.01)
(Continued)

(52) U.S. Cl.
CPC .......... *H04W 24/02* (2013.01); *H04W 16/22* (2013.01); *H04W 24/08* (2013.01); *H04B 17/318* (2015.01); *H04W 72/23* (2023.01)

(58) Field of Classification Search
CPC ..... H04W 24/02; H04W 16/22; H04W 24/08; H04W 72/23; H04W 52/245; H04B 17/318
See application file for complete search history.

(56) References Cited

U.S. PATENT DOCUMENTS

2004/0043782 A1* 3/2004 Gupta .................. H04W 88/02
455/524
2013/0272170 A1 10/2013 Chatterjee et al.
(Continued)

FOREIGN PATENT DOCUMENTS

WO   WO-2022017626 A1 *  1/2022

OTHER PUBLICATIONS

Nunez, et al., "Automatic discovery of rules for predicting network management events", In the IEEE Journal on Selected Areas in Communications, vol. 20, Issue 4, May 2002, pp. 736-745. (Year: 2002).*

(Continued)

*Primary Examiner* — Gary Mui
*Assistant Examiner* — Yewon Kim
(74) *Attorney, Agent, or Firm* — ArentFox Schiff LLP

(57) ABSTRACT

Described are examples for providing radio access network (RAN) analytics for a virtualized base station. An analytics engine includes a memory storing one or more parameters or instructions for operating the virtualized RAN and at least one processor coupled to the memory. The analytics engine is configured to perform multiple protocol layers of RAN processing for at least one cell at the virtualized base station. The analytics engine is configured to determine a time series of real-time metrics at two or more layers of the multiple protocol layers for the at least one cell or a user equipment (UE) connected to the at least one cell. The analytics engine is configured to correlate a time series for each of the two or more layers to detect a network condition. The analytics engine is configured to modify a configuration of the at least one cell based on the detected network condition.

24 Claims, 8 Drawing Sheets

(51) Int. Cl.
  *H04W 16/22* (2009.01)
  *H04W 24/08* (2009.01)
  *H04W 72/23* (2023.01)

(56) References Cited

U.S. PATENT DOCUMENTS

2015/0172939 A1* 6/2015 Huang .............. H04W 52/0203
                                                       370/241
2018/0041913 A1   2/2018 Zhu et al.
2021/0004209 A1   1/2021 Holt
2021/0345233 A1* 11/2021 Singh .................... H04W 24/02

OTHER PUBLICATIONS

Nunez, et al., "Automatic discovery of rules for predicting network management events", In the IEEE Journal on Selected Areas in Communications, vol. 20, Issue 4, May 2002, pp. 736-745.
"International Search Report and Written Opinion Issued in PCT Application No. PCT/US22/026240", Mailed Date: Aug. 16, 2022, 14 Pages.
International Search Report and Written Opinion received for PCT Application No. PCT/US2024/055591, Mar. 5, 2025, 17 pages.
Khalidi, Yousef, "Microsoft Innovation in RAN Analytics and Control", Microsoft, Dec. 21, 2022, 4 Pages.
Foukas, et al., "Orion: RAN slicing for a flexible and cost-effective multi-service mobile network architecture.", Proceedings of the 23rd annual international conference on mobile computing and networking, Oct. 4, 2017, 15 Pages.
Foukas, et al., "Programmable RAN Platform for Flexible Real-Time Control and Telemetry.", Proceedings of the 29th Annual International Conference on Mobile Computing and Networking, Oct. 2, 2023, pp. 1412-1414.
Foukas, et al., "Taking 5G Ran analytics and control to a new level.", Proceedings of the 29th Annual International Conference on Mobile Computing and Networking, Jul. 10, 2023, 16 Pages.
Polese, et al., "Understanding O-RAN: Architecture, interfaces, algorithms, security, and research challenges.", IEEE Communications Surveys & Tutorials, vol. 25, No. 2, Jan. 23, 2023, pp. 1376-1411.
Foukas, et al., "FlexRan: A Felixble and Programmable Platform for Software-Defined Radio Access Networks", 2016 pp. 428-441.
European Office Action is in corresponding European Application No. 22729838.7-1216 dated Jan. 3, 2024.

* cited by examiner

REAL-TIME RADIO ACCESS NETWORK ANALYTICS

CROSS REFERENCE TO RELATED APPLICATIONS

This application claims priority to U.S. Provisional Application No. 63/190,022 titled "REAL-TIME RADIO ACCESS NETWORK ANALYTICS," filed May 18, 2021, which is assigned to the assignee hereof, and incorporated herein by reference in its entirety.

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge serves. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device (e.g., an analytics engine) for performing analytics on a virtualized radio access network (RAN) is provided. The device includes a memory storing one or more parameters or instructions for operating the virtualized RAN and at least one processor coupled to the memory. The at least one processor is configured to perform multiple protocol layers of RAN processing for at least one cell at a virtualized base station. The at least one processor is configured to determine a time series of real-time metrics at two or more layers of the multiple protocol layers for the at least one cell or a user equipment (UE) connected to the at least one cell. The at least one processor is configured to correlate a time series for each of the two or more layers to detect a network condition. The at least one processor is configured to modify a configuration of the at least one cell based on the detected network condition.

In another example, a computer-implemented method for performing analytics on a virtualized RAN is provided. The method includes performing multiple protocol layers of radio access network (RAN) processing for at least one cell at a virtualized base station. The method includes determining a time series of real-time metrics at two or more layers of the multiple protocol layers for the at least one cell or a UE connected to the at least one cell. The method includes correlating a time series for each of the two or more layers to detect a network condition. The method includes modifying a configuration of the at least one cell based on the detected network condition.

In an example, a device for collecting real time metrics during RAN processing. The device includes a memory storing one or more parameters or instructions for operating a virtualized RAN and at least one processor coupled to the memory. The at least one processor is configured to perform multiple protocol layers of RAN processing for at least one cell at a virtualized base station within respective execution environments of the two or more protocol layers. The at least one processor is configured to execute one or more configurable codelets within each respective execution environment to determine at least one time series of real time metrics. The at least one processor is configured to export the at least one time series of the real time metrics from each respective execution environment via an application programming interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to analytics in radio access networks (RANs). A radio access network may include different network nodes that operate at different protocol layers. Various standards organizations publish specifications that define communications between the different nodes and/or protocol layers. The standardization of RANs allows compatibility and interoperability between vendors of equipment throughout the RAN.

At some level, however, standardization may limit analytics that may performed on a RAN. For example, each network node may generate various sets of data for performing operations of the network node. The data, however, may remain internal to the network node if the standards do not define a protocol for sharing the data with other nodes. In some cases, the standards may define aggregate metrics that provide some level of access to specified sets of data. For example, 3GPP TS 36.314 defines aggregate performance metrics for layer 2 measurements. Such aggregates, however, may be provided periodically rather than in real time or on demand. For example, aggregate performance metrics may be provided on a 15 minute interval. Accordingly, aggregated data may still be limited due to the aggregation and reporting levels defined in standards.

In some aspects, in a virtualized RAN, multiple network nodes and/or protocol layers may be implemented at a same location or even on the same hardware. An analytics engine at the datacenter may be able to access a time series of real-time metrics at two or more layers of the multiple protocol layers for at least one cell or a UE connected to the at least one cell. The analytics engine may correlate a time series for each of the two or more layers to detect a network condition. Accordingly, the analytics engine may be able to detect network conditions that are difficult to identify using aggregated metrics. Further, the analytics engine may modify a configuration of the at least one cell based on the detected network condition.

Figure 3:
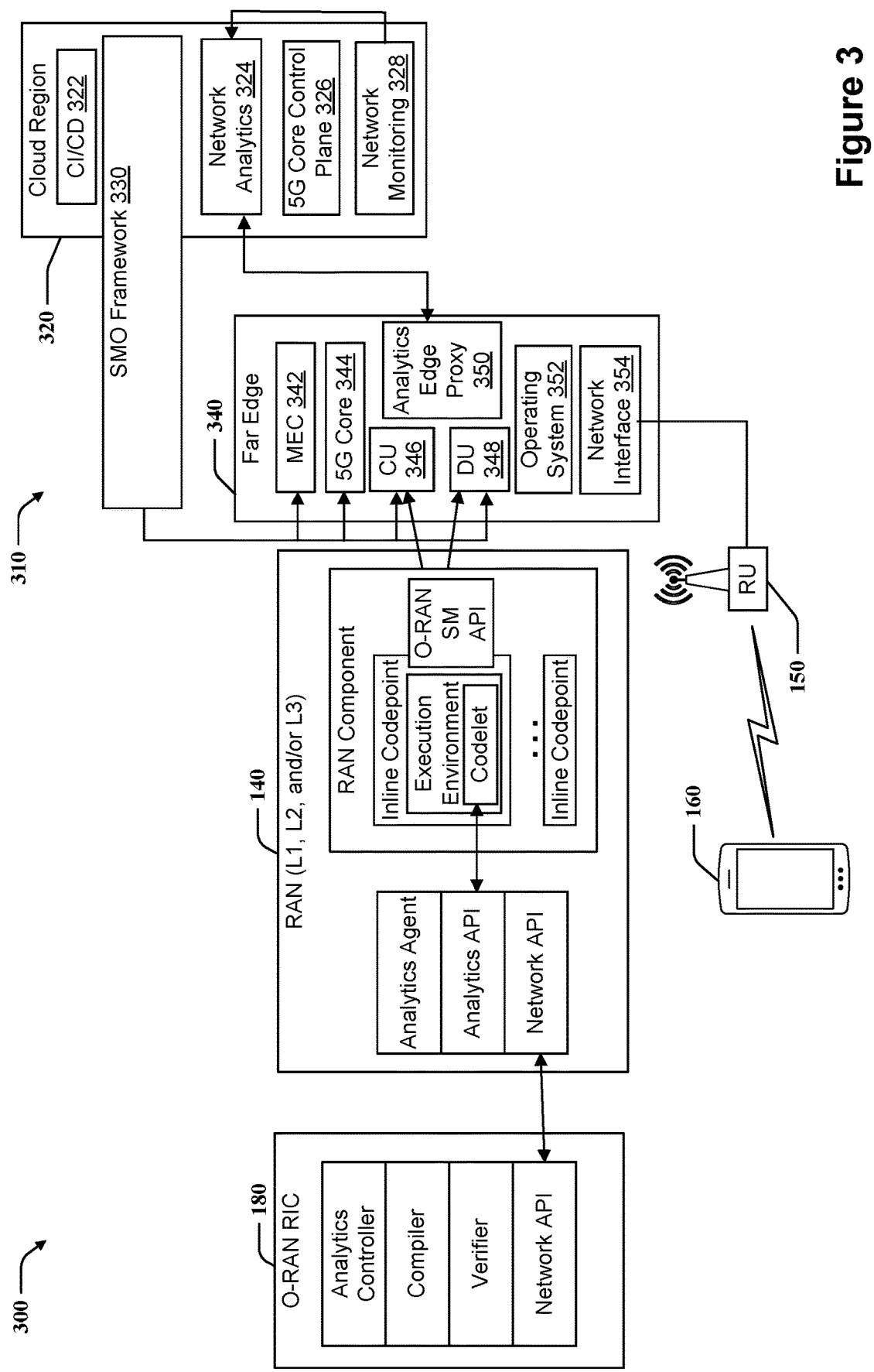
FIG. 3 is a diagram of an example architecture of a RAN implemented in a cloud network, in accordance with aspects described herein.
Figure 4:
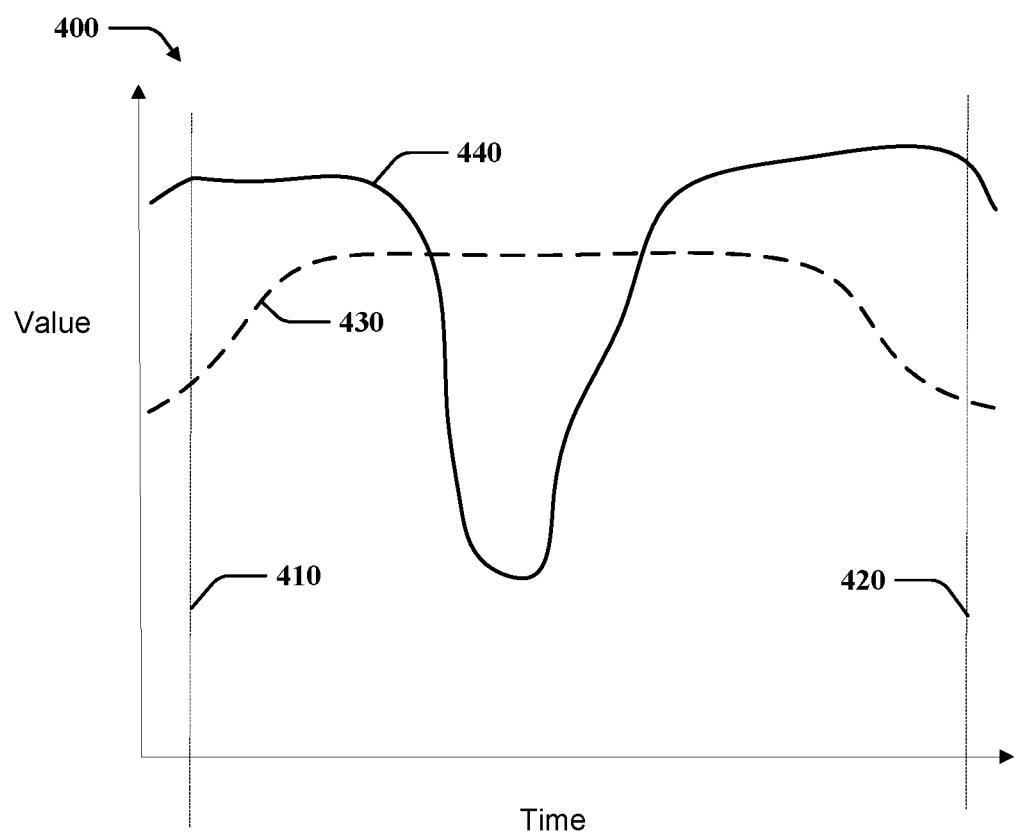
FIG. 4 is a diagram of examples of time series for a performance metric, in accordance with aspects described herein.
Figure 5:
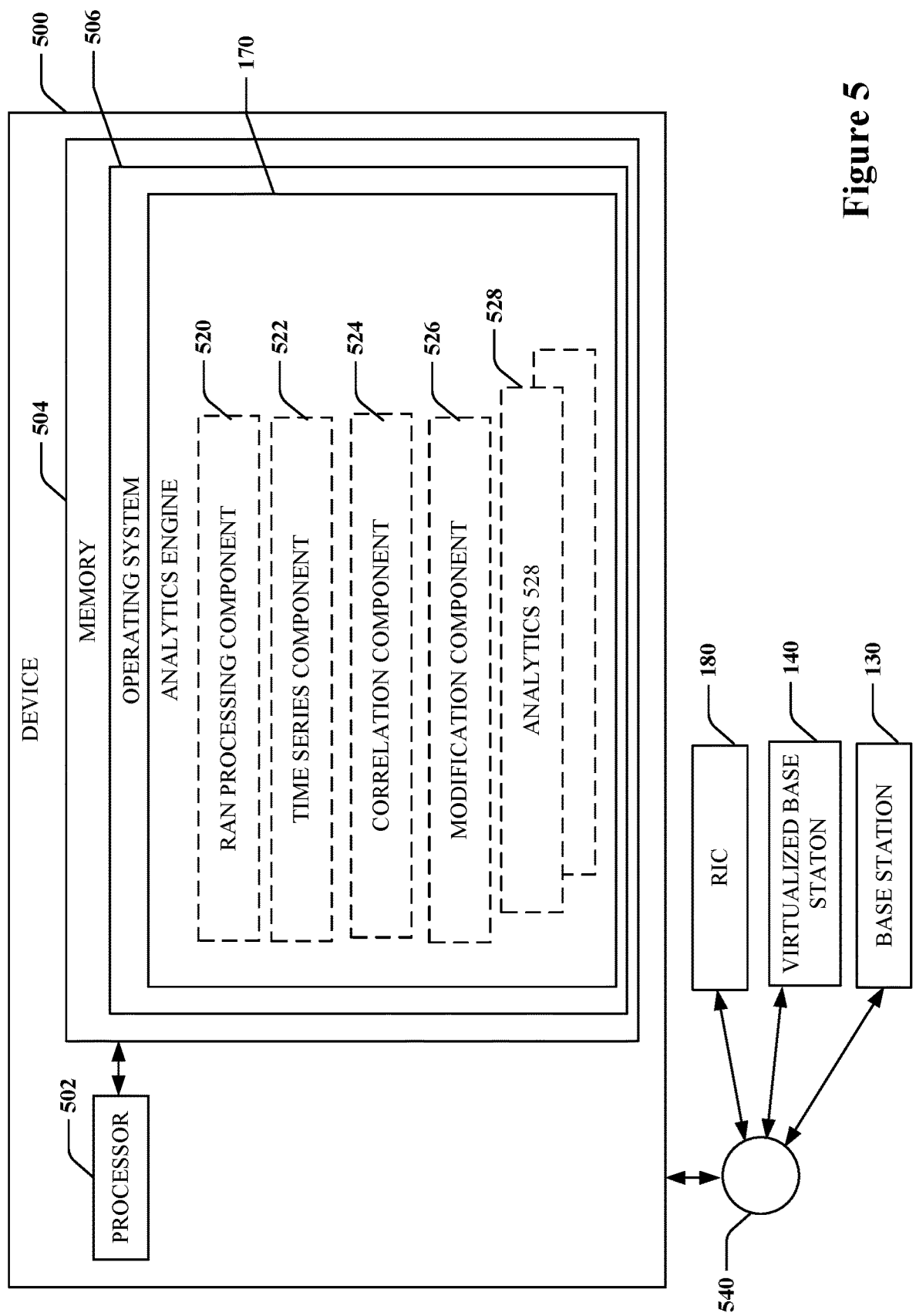
FIG. 5 is a schematic diagram of an example of a device for performing RAN analytics in a virtualized RAN, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
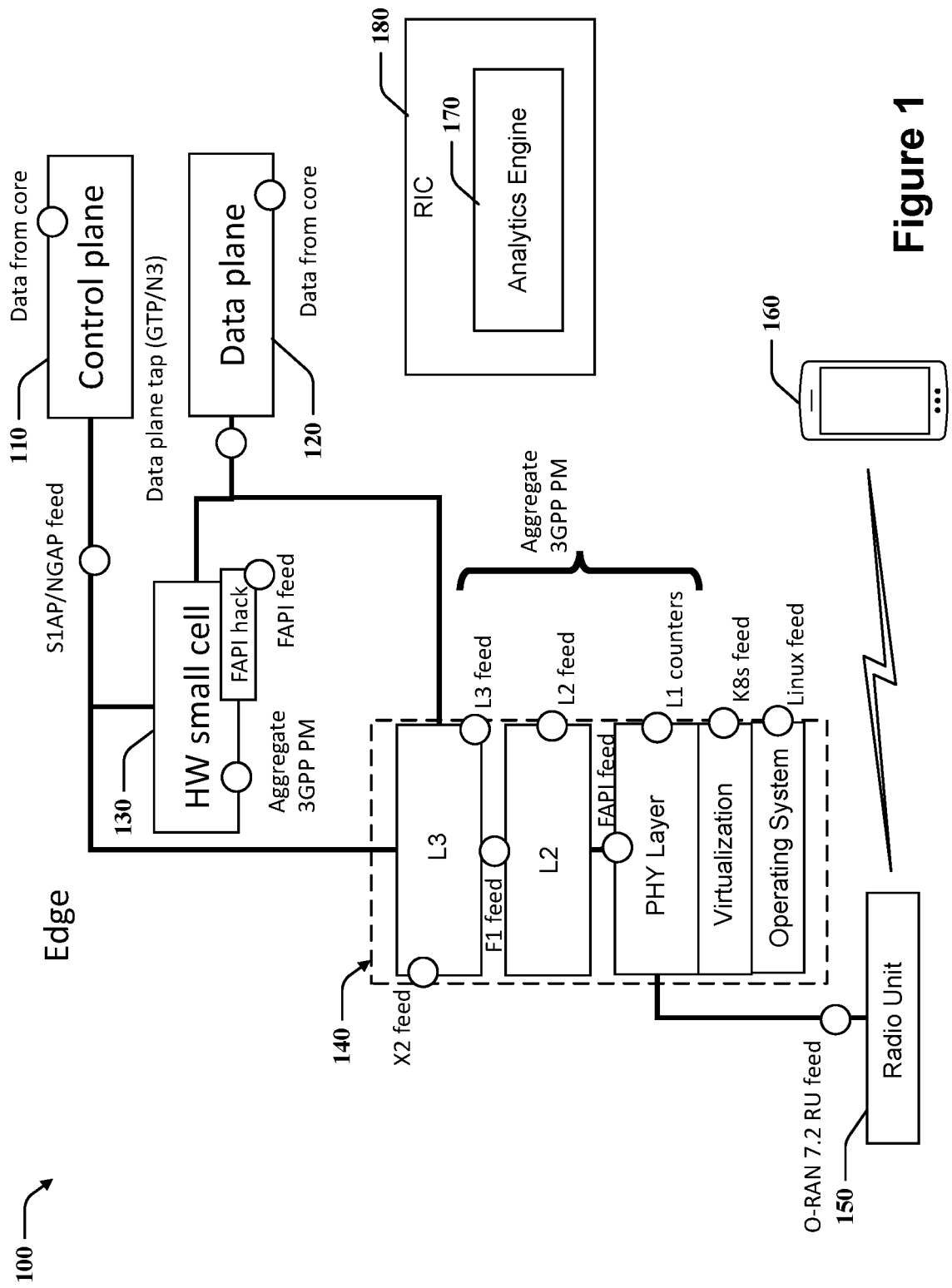
FIG. 1 is a diagram of an example of an architecture and data feeds for a virtualized radio access network (RAN), in accordance with aspects described herein.

FIG. 1 is a diagram of an example RAN 100 including interfaces and potential data feeds. Communication between the RAN 100 and a core network may be via a control plane 110 and a data plane 120. In some implementations, the RAN 100 may include a hardware small cell 130 that may perform layer 1-3 operations. In some implementations, the RAN 100 may include a virtualized base station 140, which may perform layer 1-3 operations for one or more cells. The RAN 100 may include radio units 150 that transmit and receive wireless signals with a user equipment (UE) 160. The RAN 100 may include an analytics engine 170. For example, the analytics engine 170 may be part of a RAN intelligent control (RIC) that performs autonomous configuration and optimization of the RAN 100.

An analytics engine 170 may receive a plurality of data feeds from the RAN 100. For example, the control plane 110 and the data plane 120 may carry messages that may be included in a respective feed. If the RAN 100 includes a hardware small cell 130, processing at layers 1-3 may occur within the hardware small cell 130. The hardware small cell 130 may provide metrics via defined standards. For example, the 3GPP standards such as TS 36.314 define aggregate performance metrics (PMs). In some implementations, the hardware small cell 130 may perform PHY layer processing according to a functional application platform interface (FAPI) protocol. For instance the Small Cell Forum publishes a suite of FAPI protocols including a PHY API that defines control between the MAC layer and the PHY layer. In an aspect, internal FAPI messages may be exported to provide a FAPI feed.

In a virtualized base station 140, each layer may be defined separately. For example, the virtualized base station 140 may include an operating system, a virtualization or workload manager, a PHY layer, an L2 layer, and a L3 layer. The virtualized base station 140 may provide the aggregated 3GPP PMs. Each layer of the virtualized base station 140 may be configured to export a separate feed, or the interfaces between layers may provide a data feed. Accordingly, an analytics engine 170 may receive plurality of feeds for different protocol layers from the virtualized base station. In an aspect, the feeds may include a time series of real-time metrics at two or more layers of the multiple protocol layers for at least one cell or a user equipment (UE) connected to the at least one cell.

Figure 2:
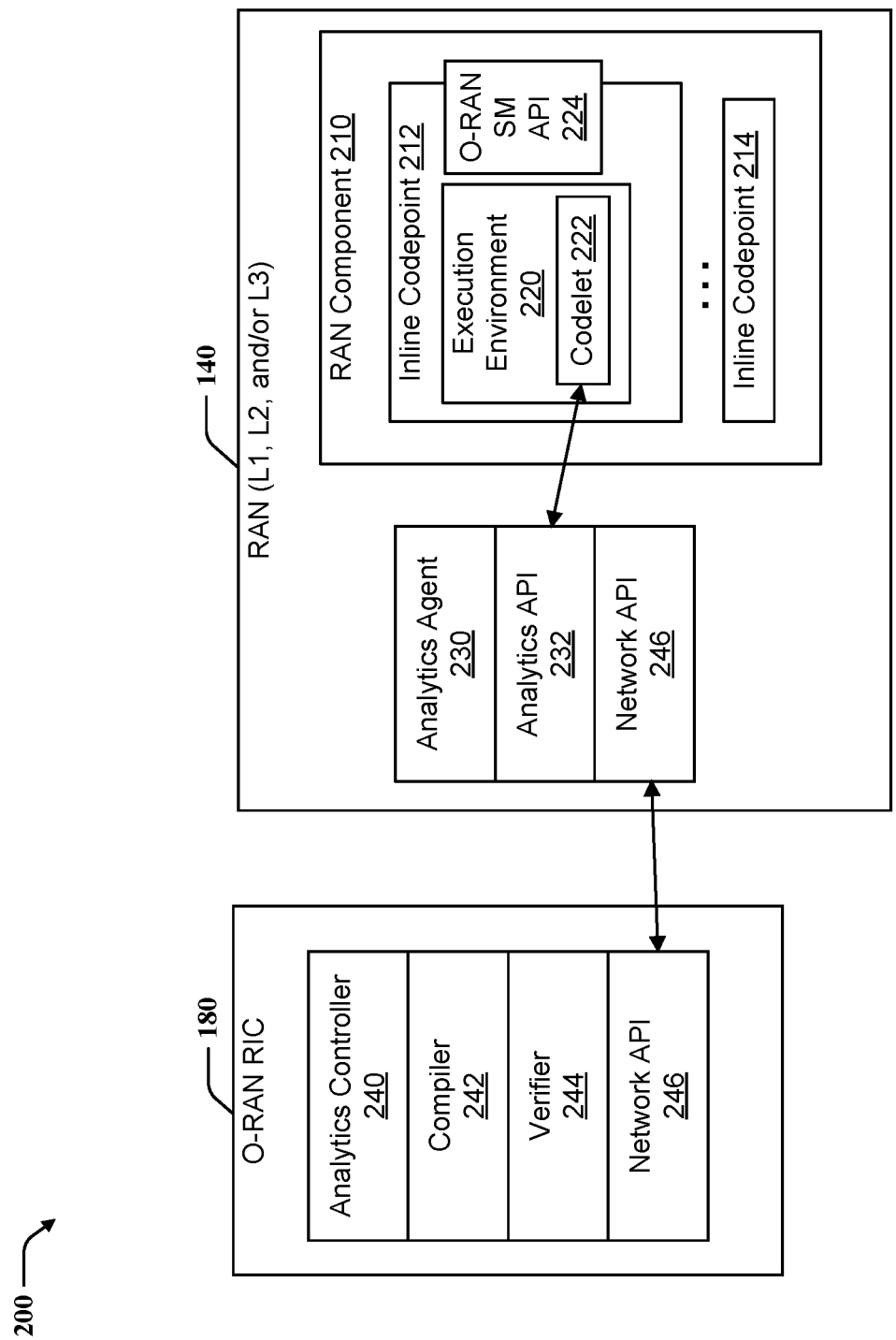
FIG. 2 is a diagram of an example architecture of a RAN intelligent controller (RIC) and a virtualized base station, in accordance with aspects described herein.

FIG. 2 is a diagram of an example architecture 200 of a RIC 180 and a virtualized base station 140. In an aspect, a RAN component 210 includes a sandboxed execution environment 220 with a codelet 222 that can be configured to export a data feed. A codelet is a set of compiled instructions that can be inserted into an execution environment. The RAN component 210 may be implemented as a series of inline codepoints 212, 214. An execution environment 220 may be included in one or more of the inline codepoints 212, 214 and the codelet may have access to parameters of the execution environment 220 at one or more codepoints 212, 214. For instance, the codelet 222 may aggregate or filter data available in the execution environment 220. The codelet 222 may be configured via an analytics agent 230 and analytics API 232. One or more codelets may define a schema for information to be exported from the execution environment 220. For example, the schema may define the metrics to be exported, timing and granularity of the metrics, and a format for the exported metrics. For example, the codelet 222 may be modified or updated based on detected network conditions to provide additional information. The analytics agent 230 may further include a network API 246 that provides an E2 interface. The RIC 180 may include an analytics controller 240 including a network API 246 for receiving the data feed via the E2 interface. In some implementations, the analytics controller may include a compiler 242 and verifier 244 for configuring the codelet 222 to export the desired data feeds. For example, the compiler 242 may compile code for extracting the real time metrics into the codelet 222. The verifier 244 may check that the compiled codelet 222 complies with the network API 246 and/or the analytics API 232. The verifier 244 may send the codelet 222 to the virtual base station 140 and/or RAN component 210 via the network API 246. In some implementations, the RAN component 210 may include an O-RAN server management (SM) API 224 that is configured to allow network control over the RAN component 210.

FIG. 3 is a diagram of an example architecture 300 of a RAN implemented in a cloud network 310. The cloud network 310 may include a cloud region 320 and a far edge 340. For example, the cloud region 320 may be implemented by one or more data centers including generic computing resources (e.g., servers). In some implementations, the cloud region 320 may be geographically distributed. The far edge 340 may be implemented at an edge data center. The far edge 340 may provide RAN processing for one or more virtual base stations. The far edge 340 may be connected to one or more of the RUs 150 that include antennas for transmitting and receiving radio-frequency (RF) signals with the UE 160. The far edge 340 may include an operating system 352 executing on computing resources (e.g., servers). In some implementations, the far edge 340 includes a network interface 354 including telecommunications grade hardware (e.g., 100 GB/s routing and fiber-optic connections).

The cloud region 320 may provide functionality including Continuous Integration/Continuous Deployment (CI/CD) 322, network analytics 324, 5G core control plane 326, and network monitoring 328, and a server management object (SMO) framework 330. The far edge 340 may provide functionality including multi-edge computing 342, 5G core 344 (e.g., data plane), central unit (CU) 346 RAN processing, distributed unit (DU) 348 RAN processing, and an analytics edge proxy 350.

CI/CD 322 may provide ongoing support for a RAN. For example, as discussed herein, network analytics and codelets may be dynamically deployed to continuously locate and address issues affecting network performance.

The network analytics 324 may perform analytics on time series of real-time metrics as described in further detail below. In an aspect, the network analytics 324 may receive the series of real-time metrics from the far edge 340. In some implementations, the network analytics 324 may configure the analytics edge proxy to perform an analytic at the far edge 340. For example, where the analytic detects an issue at the virtual base station based on, for example, L1 and L2 metrics, performing the analytic at the far edge 340 may be faster and more efficient than forwarding the time series to the network analytics 324.

The 5G core control plane 326 may perform 5G core control plane functions such as authentication, mobility management, security control, and radio resource control (RRC) messaging.

The network monitoring 328 may perform monitoring of the cloud network 310. For example, the network monitoring 328 may include measuring performance metrics within the cloud network 310.

In an aspect, a RAN analytics system may utilize the SMO framework 330. The analytics may operate on metrics generated at geographically distributed locations. For example, a RAN may include multiple far edge datacenters that each implement one or more virtual base stations. The SMO framework 330 may implement and manage the analytics edge proxy 350 for each far edge datacenter. In some implementations, the SMO framework 330 may manage the MEC 342, the 5G core 344, the CU 346, and the DU 348 at each data center of the far edge 340. Additionally, some analytics may relate to higher level messaging (e.g., control plane or RRC messages). The SMO framework 330 may implement and manage network analytics 324

The data feeds provided by the RAN 100 and architectures 200 and 300 may increase the data available for RAN analytics. In particular, the data feeds may provide real-time metrics for different layers of RAN processing. For example, the data feeds may provide a time series of a real-time metric. The analytics engine 170 may correlate a time series for each of the two or more layers to detect a network condition. Example network conditions may include: a sleeping cell, high received signal strength indicator (RSSI) impacting performance, poor cell coverage, MIMO inefficiency, PDCCH congestion, scheduler inefficiency, neighbor cell interference, and protocol inefficiencies. The analytics engine 170 may be configured to detect one or more of the network conditions. In some implementations, one or more analytics may be activated in response to detection of a performance issue. For instance, if a key performance indicator (KPI) based on conventional analytics falls below a threshold, the analytics engine 170 may activate a corresponding analytic to assess the performance issue and determine a network condition. Additionally, the analytics engine 170 and/or the RIC 180 may modify a configuration of the at least one cell based on the dedicated network condition. Further, additional analytics may be added to the analytics engine.

A sleeping cell may refer to a cell that is not carrying traffic but is also not generating an alarm. For instance, a sleeping cell may appear as if there are no UEs connected to the sleeping cell, when the sleeping cell may not be responding to UEs attempting to connect. For example, the sleeping cell may be hung due to a software bug. Conventional techniques for detecting a sleeping cell may rely on aggregated metrics, which may be reported every 15 minutes. Multiple reports may be used to identify a sleeping cell, so such a cell may be effectively out of service for a significant amount of time. In an aspect, an analytic may be configured to collect a time series of physical layer random access (PRACH) messages and a time series of radio resource control (RRC) layer messages. If the ratio of detected PRACH messages to RRC messages is greater than a threshold for a cell, the cell may be sleeping. The RIC may reset, lock, or unlock the cell. For instance, locking the cell may cause UEs to connect to other cells and later unlocking the cell may resolve an issue due to a previous load on the cell. Similarly, resetting the cell may drop connections but resolve a software issue.

High RSSI measurements for a UE at a cell may generally indicate a good connection between the cell and the UE. Various parameters may be selected based on the assumption of a good connection. In some cases, packet loss may be high even though the RSSI measurements are good. An analytic may be configured to collect a series of RSSI of an idle channel of an observed cell. Generally, an idle channel is not expected to receive signals, so metrics for an idle channel are not reported. The RSSI of the idle channel may be correlated with a time series for a packet loss metric to determine whether another cell is causing interference that results in the packet loss at the observed cell or the UE. The RIC 180 may modify a transmission power of one or more adjacent cells while observing the RSSI of the idle channel to determine which cell is causing the interference. The RIC 180 may permanently change the transmission power if doing so would improve performance of the observed cell, the UE, or a system metric (e.g., total throughput).

Poor cell coverage refers to a condition where a RSSI from many users is low. For example, poor cell coverage may be due to antenna configuration and obstructions affecting the radio environment. Conventionally, coverage for a cell is checked via manual field measurements. Aggregated PMs may generally indicate a coverage problem in a cell, but cannot identify a poor coverage area. An analytic may be configured to collect a time series of RSSI measurements for each of a plurality of UEs connected to the cell and a time series of handover events.

FIG. 4 is a chart 400 of RSSI measurements plotted against handover events for two UEs. The time may be scaled to align a hand in event 410 and a hand out event 420. The RSSI measurements may indicate a trajectory of the UE within the cell between the hand in event 410 and a hand out event 420. An RSSI series 430 may indicate a standard pattern for good RSSI coverage. The RSSI may be lower at the handover events, which generally occur near an edge of the cell. The RSSI series 440 may indicate a potential coverage issue due to relatively low RSSI values in the middle of the time that the UE was in the cell. In an aspect, the UE location at the time of the low RSSI values may be estimated based on a trajectory of the UE between the neighbors cells involved in the handover events. If multiple UEs experience low RSSI values at similar estimated location, there may be poor coverage at the location. The RIC 180 may attempt to resolve the poor coverage by adjusting an antenna angle of the cell.

MIMO inefficiency may refer to condition where MIMO transmission are unsuccessful. For example, a MIMO failure may occur when a high rank MIMO transmission (e.g., with a rank indicator, strongest layer indicator, or modulation and coding scheme (MCS) above a threshold) is selected based on measurements, but a negative acknowledgment is received for the transmission. In some cases, MIMO failures may include transmissions where low rank transmissions (e.g., rank, strongest layer indicator, or MCS less than a threshold) are used instead of high rank MIMO transmissions. An analytic may be configured to collect a per packet timing advance series and a path loss series (e.g., based on RSSI). A successful high rank MIMO transmission may rely on both sufficient signal strength and a consistent timing advance. If a correlation of the MIMO failures with the timing advance series and path loss series indicate that the MIMO failures occur with stable timing advance, the RIC 180 may increase transmission power to improve MIMO success. In contrast, if the timing advance is not stable, an increase in transmission power may not improve MIMO success.

PDCCH congestion refers to a condition where a scheduler is unable to transmit sufficient downlink control information (DCI) to schedule available data. For example, PDCCH congestion may occur when UEs are configured with small or overlapping PDCCH resources (referred to as control resource sets (CORESETS)). Conventional analytics may be unable to detect PDCCH congestion as scheduling occurs internally within a cell. An analytic may be configured to collect a time series of DCI messages and a time series of bandwidth utilized. For example, the time series of DCI messages may be a number of DCI messages transmitted in a unit of time (e.g., slot or sub-frame) and the time series of bandwidth utilized may be a percentage of resources scheduled in the unit of time. A correlation between a large number of DCIs and low bandwidth utilization may indicate PDCCH congestion. The RIC 180 may change a PDCCH search space for one or more UEs in response to detecting PDCCH congestion.

Scheduler inefficiency may refer to utilization of dedicated resources such as a random access channel (RACH). If resources are dedicated to the RACH, the resources may not be used to schedule data transmissions. An analytic may be configured to collect a time series of RACH messages and a time series of bandwidth utilization. If low a low number of RACH messages correlates with high bandwidth utilization, the RIC 180 may adjust the RACH configuration to use fewer resources. For instance, the RIC 180 may reduce a number of configured RACH opportunities based on the utilization rate.

Neighbor cell conflicts may occur when a cell configuration conflicts with a cell with an overlapping range. For example, cells with overlapping ranges should have unique PCIs with different modulus 3 values. In some cases, cell conflicts may occur in a chidden node scenario where a UE is within range of the two cells, but the two cells do not sense each other. In an aspect, an analytic may be configured to collect a series of RRC messages indicating handovers and a series of physical layer metrics indicating transmission failure. For example, the analytic may include analyzing the RRC messages to see if the UEs start reporting a new neighbor in the measurement reports. The analytic may include analyzing RRC messages and see if the handover rates start increasing. The analytic may include analyzing FAPI messages to determine if there is sudden change in SNR, NACKs, retransmissions, or other indicators of transmission failure. The RIC 180 may modify a configuration of one or more cells if a neighbor cell conflict is detected.

Protocol inefficiencies may refer to a protocol configuration that results in decreased performance. An analytic may be configured to use machine learning to detect potential protocol inefficiencies. For example, the analytic may collect RAN tracing metrics and a series of physical layer metrics indicating transmission failures. A machine learning model may be generated to detect a network condition.

Synchronization may refer to timing differences over a radio link between the RU 150 and the UE 160. A timing difference or a change in timing difference (i.e., jitter) may result in performance degradation such as false random access requests and reduced throughput. An analytic may be configured to measure timing of packets at the RU 150 (e.g., XTran protocol packets between the RU 150 and DU 348) and determine inter-packet delay. Pre-processing may be performed to determine jitter. The jitter may be correlated with potential degradation events such as random access requests or changes in transport block size to determine whether the jitter may be causing such event by affecting synchronization between the RU 150 and the UE 160. The RIC 180 may adjust a timing advance of the at least one UE (e.g., accommodate greater delay) when a jitter for the UE being greater than a threshold corresponds to the random access messages.

FIG. 5 is a schematic diagram of an example of a device 500 (e.g., a computing device) for performing RAN analytics. The device 500 may be an example of an analytics engine 170. The analytics engine 170 may implement the analytics edge proxy 350. In some implementations, another analytics engine 170 may implement the network analytics 324. The device 500 may reside within a data center, which may be located in the far edge 340 or the cloud region 320. For example, a data center in the far edge 340 may provide the RIC 180 and/or the virtualized base station 140. The data center may be an edge data center. The device 500 may be connected to other servers within the data center via the switch 540 and wired connections.

In an example, device 500 can include a processor 502 and/or memory 504 configured to execute or store instructions or other parameters related to providing an operating system 506, which can execute one or more applications or processes, such as, but not limited to, the analytics engine 170. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein.

In an example, the analytics engine 170 may include one or more of a RAN processing component 520 configured to perform multiple layers of RAN processing or at least one cell at a virtualized base station, a time series component 522 configured to determine a time series of real-time metrics at two or more layers of the multiple protocol layers for the at least one cell or a UE connected to the at least one cell, a correlation component 524 configured to correlate the time series for each of the two or more layers to detect a network condition, and a modification component 526 configured to modify a configuration of the at least one cell based on the detected network condition.

Additionally, the analytics engine 170 may be configured with a plurality of analytics 528. Each of the analytics 528 may configure the analytics engine 170 to detect a network condition and modify a configuration to address the network condition. For example, the analytics 528 may specify the time series to collect, the correlation to be performed, conditions defining the network condition, and the modification to be performed if the network condition is detected. For example, an analytic 528 may be configured for one or more of sleeping cells, high RSSI measurements, poor cell coverage, MIMO inefficiency, PDCCH congestion, scheduler inefficiency, neighbor cell conflicts, protocol inefficiencies, or timing synchronization as described above.

Figure 6:
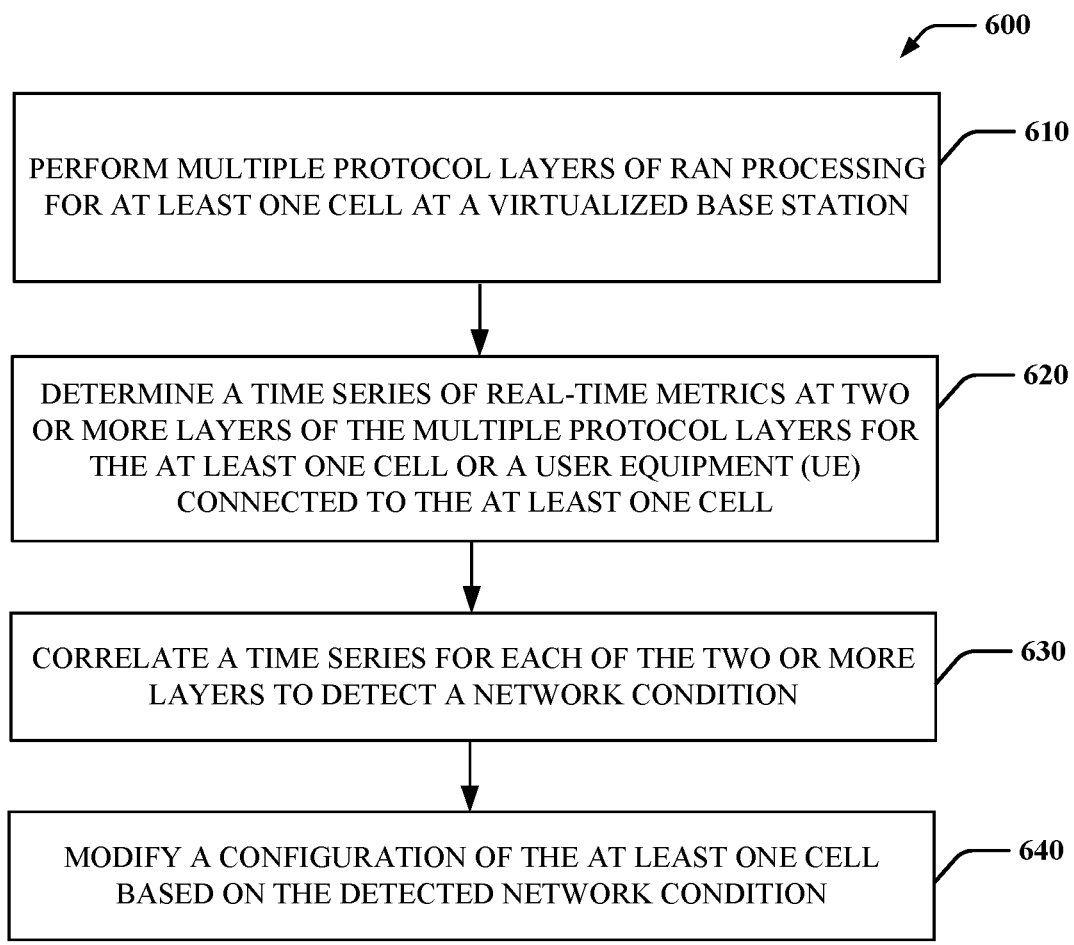
FIG. 6 is a flow diagram of an example of a method of performing RAN analytics in a virtualized RAN, in accordance with aspects described herein.

FIG. 6 is a flow diagram of an example of a method 600 for performing RAN analytics. For example, the method 600 can be performed by a device 500 and/or one or more components thereof to detect a network condition and modify a configuration to improve the network condition.

At block 610, the method 600 includes performing multiple protocol layers of RAN processing for at least one cell at a virtualized base station. In an example, the RAN processing component 520, e.g., in conjunction with processor 502, memory 504, and operating system 506, can perform multiple protocol layers of RAN processing for at least one cell at the virtualized base station 140.

At block 620, the method 600 includes determining a time series of real-time metrics at two or more layers of the multiple protocol layers for the at least one cell or a UE connected to the at least one cell. In an example, the analytics engine and/or the time series component 522, e.g., in conjunction with processor 502, memory 504, and operating system 506, can determine a time series of real-time metrics at two or more layers of the multiple protocol layers for the at least one cell or the UE connected to the at least one cell.

At block 630, the method 600 includes correlating a time series for each of the two or more layers to detect a network condition. In an example, the analytics engine 170 and/or the correlation component 524, e.g., in conjunction with processor 502, memory 504, and operating system 506, can correlate the time series for each of the two or more layers to detect the network condition.

At block 640, the method 600 includes modifying a configuration of the at least one cell based on the detected network condition. In an example, the analytics engine 170 and/or the modification component 526, e.g., in conjunction with processor 502, memory 504, and operating system 506, can modify the configuration of the at least one cell based on the detected network condition.

Figure 7:
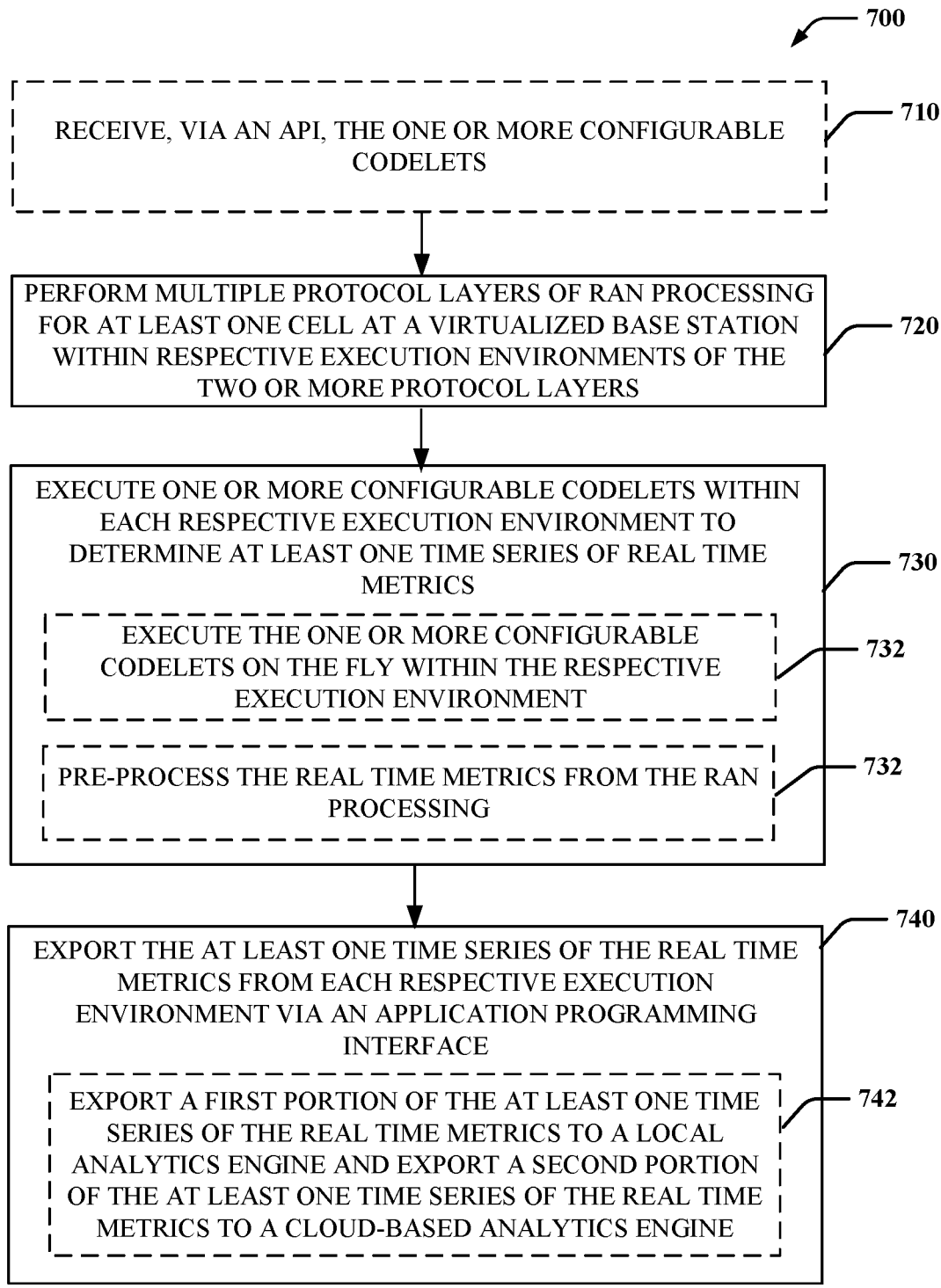
FIG. 7 is a flow diagram of an example of a method of collecting real time metrics during RAN processing, in accordance with aspects described herein.

FIG. 7 is a flow diagram of an example of a method 700 for collecting real time metrics in a virtual RAN. For example, the method 700 can be performed by a device 500 and/or one or more components thereof to export the real time metrics from a RAN processing component (e.g., RAN processing component 520). The method 700 may be performed in conjunction with the method 600. For example, the method 700 may correspond to the block 610.

At block 710, the method 700 optionally includes receiving, via an API, the one or more configurable codelets. In an example, the analytics engine 170 and/or the RAN processing component 520, e.g., in conjunction with processor 502, memory 504, and operating system 506, can receive, via the network API 246 and/or the analytics API 232, the one or more configurable codelets 222. In some implementations, the codelets have been compiled and verified by the compiler 242 and verifier 244 at the O-RAN RIC 180.

At block 720, the method 700 includes performing multiple protocol layers of RAN processing for at least one cell at a virtualized base station within respective execution environments of the two or more protocol layers. In an example, the analytics engine 170 and/or the RAN processing component 520, e.g., in conjunction with processor 502, memory 504, and operating system 506, can perform multiple protocol layers of RAN processing (e.g., for CU 346 and DU 348) for at least one cell at a virtualized base station 140 within respective execution environments 220 of the two or more protocol layers.

At block 730, the method 700 includes executing one or more configurable codelets within each respective execution environment to determine at least one time series of real time metrics. In an example, the analytics engine 170 and/or the RAN processing component 520, e.g., in conjunction with processor 502, memory 504, and operating system 506, can execute one or more configurable codelets 222 within each respective execution environment 220 to determine at least one time series of real time metrics (e.g., RSSI series 430 or 440). For instance, at sub-block 732, the block 730 may include executing the one or more configurable codelets on the fly within the respective execution environment. That is, the RAN processing component 520 may execute the codelets 222 received at block 710 during run-time. Accordingly, the RAN processing component 520 may be dynamically configured to provide a time series for a real time metric, for example, in response to a detected network condition. In some implementations, at sub-block 732, the block 730 may include pre-processing the real time metrics from the RAN processing. For example, the RAN processing may include receiving packets and a timestamp may be associated with each packet. The pre-processing may include determining inter-packet delays based on the timestamps and determining a jitter metric based on the inter-packet delays.

At block 740 the method 700 includes exporting the at least one time series of the real time metrics from the execution environment via an application programming interface. In an example, the analytics engine 170 and/or the RAN processing component 520, e.g., in conjunction with processor 502, memory 504, and operating system 506, can export the at least one time series (e.g., RSSI series 430 or 440) of the real time metrics via an API (e.g., network API 246). For example, at sub-block 742, the block 740 may include exporting a first portion of the at least one time series of the real time metrics to a local analytics engine (e.g., analytics edge proxy 350) and exporting a second portion of the at least one time series of the real time metrics to a cloud-based analytics engine (e.g., network analytics 324).

Figure 8:
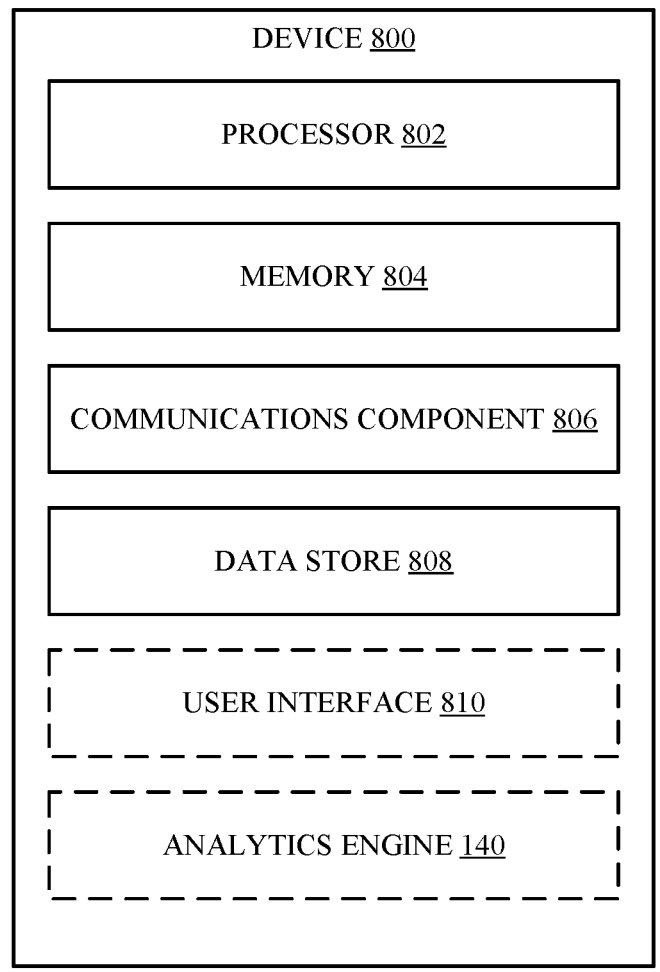
FIG. 8 is a schematic diagram of an example of a device for performing functions described herein, in accordance with aspects described herein.

FIG. 8 illustrates an example of a device 800 including additional optional component details as those shown in FIG. 5. In one aspect, device 800 may include processor 802, which may be similar to processor 502 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 504 such as for storing local versions of operating systems (or components thereof) and/or applications being executed by processor 802, such as analytics engine 170, RIC 180, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc. not currently being executed by processor 802. In addition, data store 808 may be a data repository for analytics engine 170, RIC 180, and/or one or more other components of the device 800.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include the analytics engine 170 for analyzing time series of metrics at different layers to detect network conditions and modify a configuration of a cell, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for performing analytics on a virtualized radio access network (RAN), comprising:
    one or more memories, individually or in combination, storing one or more parameters or instructions for operating the virtualized RAN; and
    one or more processors coupled to the memory, wherein the one or more processors, individually or in combination are configured to:
        perform multiple protocol layers of radio access network (RAN) processing for at least one cell at a virtualized base station within respective execution environments of each of the multiple protocol layers;
        receive, via an application interface, one or more configurable codelets at each respective execution environment;
        execute the one or more configurable codelets on the fly within each respective execution environment to determine a time series of real-time metrics at two or more layers of the multiple protocol layers for the at least one cell or a user equipment (UE) connected to the at least one cell to generate a first time series for a first protocol layer and a second time series for a different second protocol layer;
        correlate the first time series and the second time series to detect a network condition; and
        modify a configuration of the at least one cell based on the detected network condition.

2. The device of claim 1, wherein the network condition is a cell that is not carrying traffic and wherein a ratio of physical layer random access messages (PRACH) to radio resource control (RRC) layer messages is greater than a threshold, and wherein the at least one processor is configured to reset, lock, or unlock the cell.

3. The device of claim 1, wherein the time series for each of the two or more layers includes a series of received signal strength indicators (RSSI) of an idle channel of a single cell and a time series for a packet loss metric, wherein the at least one processor is configured to modify a transmission power of one or more adjacent cells.

4. The device of claim 1, wherein the time series for each of the two or more layers includes a time series of RSSI measurements for each of a plurality of UEs connected to the cell and a time series of handover events, wherein the one or more processors, individually or in combination, are configured to:
    determine a handover to the cell and a handover from the cell of each UE based on RRC layer messages;
    determine a trajectory of each UE within the cell based on the handover to the cell and the handover from the cell or a measured RSSI level; and
    identify a region of low coverage within the cell based on a correlation of the measured RSSI level for a portion of the trajectory for the plurality of UEs.

5. The device of claim 4, wherein the one or more processors, individually or in combination, are configured to adjust an antenna angle or increase a transmission power of the at least one cell.

6. The device of claim 1, wherein the time series for each of the two or more layers includes a per packet timing advance series and a path loss series; wherein the one or more processors, individually or in combination, are configured to:
    correlate the timing advance series and the path loss series with multiple input multiple output (MIMO) failures, and
    increase transmission power when the timing advance series is stable and the path loss series is higher than a threshold.

7. The device of claim 1, wherein the time series for each of the two or more layers includes a number of downlink control information (DCI) messages transmitted on a physical downlink control channel (PDCCH) and a percentage of bandwidth utilized, wherein the one or more processors, individually or in combination, are configured to change a PDCCH search space for one or more UEs when the number of DCI messages is greater than a threshold and the percentage of bandwidth utilized is less than a threshold.

8. The device of claim 1, wherein the time series for each of the two or more layers includes a utilization rate of a random access channel (RACH) opportunities and a percentage of bandwidth utilized, wherein the one or more processors, individually or in combination, are configured to adjust a number of configured RACH opportunities based on the utilization rate.

9. The device of claim 1, wherein the time series for each of the two or more layers includes a series of RRC messages indicating handovers and a series of physical layer metrics indicating transmission failure, wherein the one or more processors, individually or in combination, are configured to resolve a cell parameter conflict with a neighbor cell.

10. The device of claim 1, wherein the time series for each of the two or more layers includes RAN tracing metrics and a series of physical layer metrics indicating transmission failure, wherein the one or more processors, individually or in combination, are configured to generate a machine learning model that detects the network condition.

11. The device of claim 1, wherein the time series for each of the two or more layers includes jitter and random access messages, wherein the one or more processors, individually or in combination, are configured to adjust a timing advance of the at least one UE when a jitter for the UE being greater than a threshold corresponds to the random access messages.

12. The device of claim 1, wherein the one or more processors, individually or in combination, are configured to determine the time series of real-time metrics using codelets within respective execution environments of the two or more protocol layers and modify the codelets in response to the detected network condition.

13. A method comprising:
performing multiple protocol layers of radio access network (RAN) processing for at least one cell at a virtualized base station within respective execution environments of each of the multiple protocol layers;
receiving, via an application interface, one or more configurable codelets at each respective execution environment;
executing the one or more configurable codelets on the fly within each respective execution environment to determine a time series of real-time metrics at each of two or more layers of the multiple protocol layers for the at least one cell or a user equipment (UE) connected to the at least one cell to generate a first time series for a first protocol layer and a second time series for a different second protocol layer;
correlating the first time series and the second time series to detect a network condition; and
modifying a configuration of the at least one cell based on the detected network condition.

14. The method of claim 13, wherein the network condition is a cell that is not carrying traffic and wherein a ratio of physical layer random access messages (PRACH) to radio resource control (RRC) layer messages is greater than a threshold, and wherein modifying the configuration comprises resetting, locking, or unlocking the cell.

15. The method of claim 13, wherein the time series for each of the two or more layers includes a time series of RSSI measurements for each of a plurality of UEs connected to the cell and a time series of handover events, wherein the correlating comprises:
determining a handover to the cell and a handover from the cell of each UE based on RRC layer messages;
determining a trajectory of each UE within the cell based on the handover to the cell and the handover from the cell or a measured RSSI level; and
identifying a region of low coverage within the cell based on a correlation of the measured RSSI level for a portion of the trajectory for the plurality of UEs.

16. The method of claim 15, wherein modifying the configuration of the at least one cell comprises adjusting an antenna angle or increasing a transmission power of the at least one cell.

17. The method of claim 13, wherein the time series for each of the two or more layers includes a per packet timing advance series and a path loss series; wherein the correlating comprises correlating the timing advance series and the path loss series with multiple input multiple output (MIMO) failures, and wherein modifying the configuration comprises increasing power when the timing advance series is stable and the path loss series is higher than a threshold.

18. The method of claim 13, wherein the time series for each of the two or more layers includes a number of downlink control information (DCI) messages transmitted on a physical downlink control channel (PDCCH) and a percentage of bandwidth utilized, wherein modifying the configuration comprises changing a PDCCH search space for one or more UEs when the number of DCI messages is greater than a threshold and the percentage of bandwidth utilized is less than a threshold.

19. The method of claim 13, wherein the time series for each of the two or more layers includes jitter and random access messages, wherein modifying a configuration of the at least one cell includes adjusting a timing advance of the at least one UE when a jitter for the UE being greater than a threshold corresponds to the random access messages.

20. The method of claim 13, determining the time series of real-time metrics comprises configuring codelets within respective execution environments of the two or more protocol layers and wherein modifying the configuration of the at least one cell based on the detected network condition comprises modifying the codelets in response to the detected network condition.

21. A device for performing analytics on a virtualized radio access network (RAN), comprising:
one or more memories storing one or more parameters or instructions for operating the virtualized RAN; and
one or more processors coupled to the one or more memories, wherein the one or more processors, individually or in combination, are configured to:
perform multiple protocol layers of radio access network (RAN) processing for at least one cell at a virtualized base station within respective execution environments of the two or more protocol layers;
receive, via an application interface, one or more configurable codelets at each respective execution environment;
execute the one or more configurable codelets on the fly within each respective execution environment of the two or more protocol layers to determine at least one time series of real time metrics; and
export the at least one time series of the real time metrics from each respective execution environment to an analytics engine via an application programming interface.

22. The device of claim 21, wherein the one or more configurable codelets define a schema for exporting the at least one time series of real time metrics.

23. The device of claim 21, wherein the at least one processor is configured to pre-process the real time metrics from the RAN processing prior to exporting the at least one time series of the real time metrics.

24. The device of claim 21, wherein the at least one processor is configured to export a first portion of the at least one time series of the real time metrics to a local analytics engine and export a second portion of the at least one time series of the real time metrics to a cloud-based analytics engine.

* * * * *